Feb. 13, 1968  A. RONZANI  3,368,543
MECHANICAL SAWS
Filed Aug. 27, 1964  3 Sheets-Sheet 1
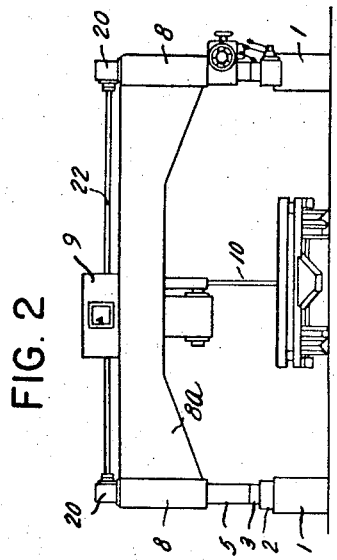
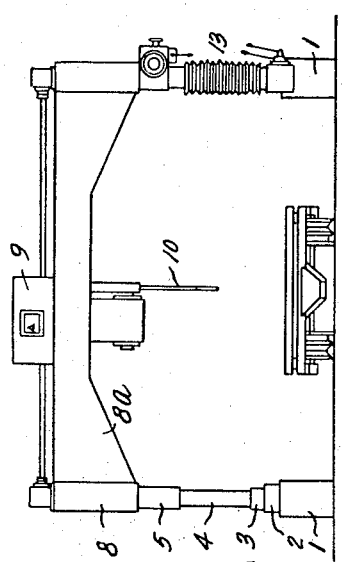
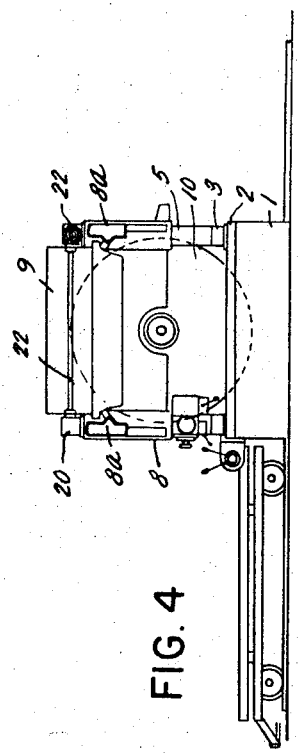
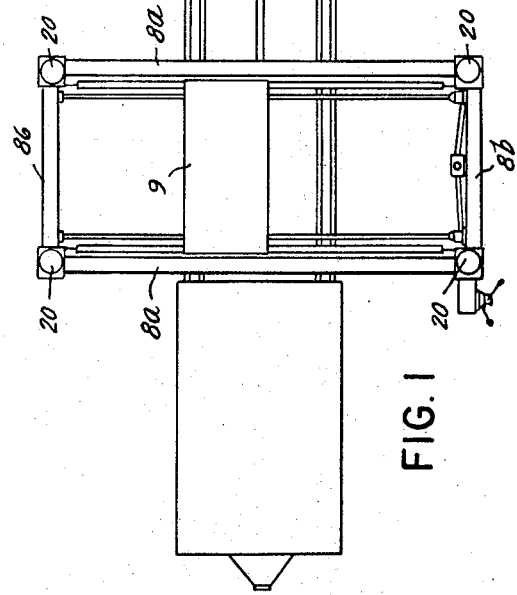
INVENTOR
ANGELO RONZANI
BY
PATENT AGENT

INVENTOR
ANGELO RANZANI

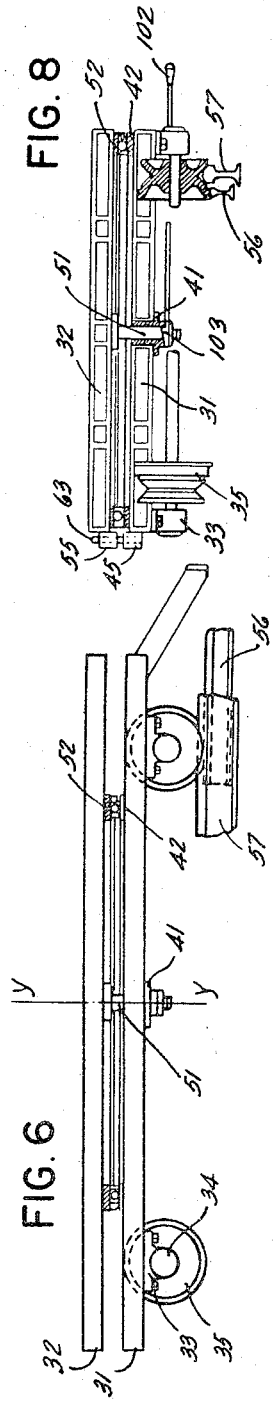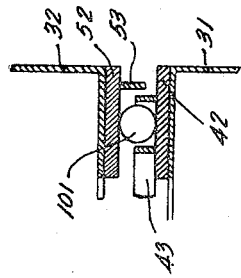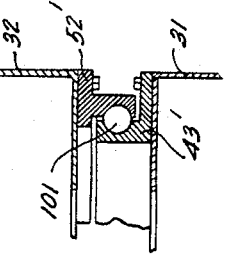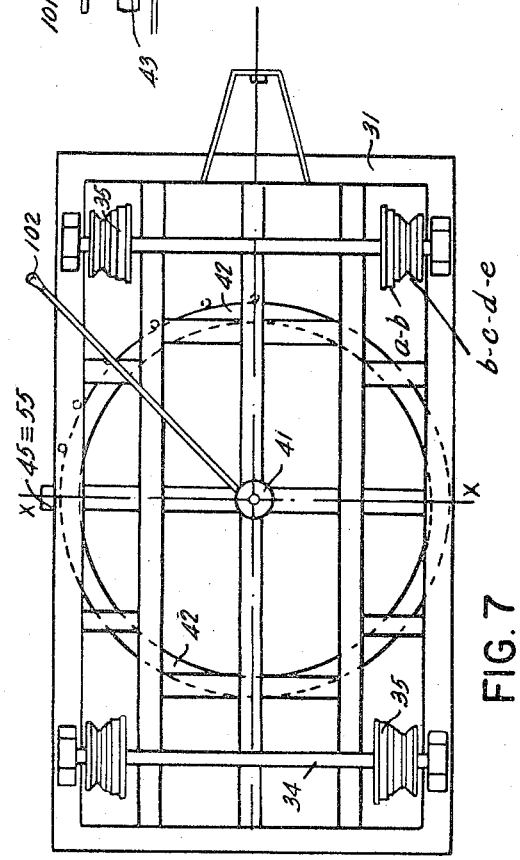

United States Patent Office 3,368,543
Patented Feb. 13, 1968

3,368,543
MECHANICAL SAWS
Angelo Ronzani, Levico, Italy, assignor to S.p.A. Secoblitz Industria Meccanica, Levico, Trento, Italy
Filed Aug. 27, 1964, Ser. No. 392,561
Claims priority, application Italy, Aug. 30, 1963, 18,080/63
2 Claims. (Cl. 125—13)

ABSTRACT OF THE DISCLOSURE

A stone sawing apparatus having a saw blade supported on a horizontally and vertically adjustable gantry and a rotatably adjustable work carriage mounted for movement beneath the blade. Vertically adjustable supports for the gantry are formed of hollow cylindrical vertical base members on which the gantry is vertically slidable. Adjustment is provided by means of a nut mounted on a projection in the upper portion of the support members with a screw connected to the gantry for vertical movement.

---

The present invention concerns mechanical saws having a rotary cutting tool for cutting blocks of marble into slabs.

Machines for sawing marble are known, in which use is made of a disc for cutting blocks, even shapeless ones, into slabs, said blocks coming directly from quarries. In these machines, the cutting tool is actuated by means of a kinematic chain from the rotary movement imparted by a motor. This unit is supported by a mobile bridge which, for the cutting of each slab, may be displaced laterally along guides provided on the transverse bays or spans of a fixed bearing structure. The bridge which carries the driving members of the cutting tool has a certain degree of vertical displacement making it possible to locate the tool in the most suitable position relatively to a block supported by a lower truck. This constitutes a serious disadvantage in the sense that it is only possible to work blocks of comparatively small depth. In fact, the transverse supporting gantries of the bridge resulting from the structure of known machines cannot assume sizes sufficient to permit the treatment of the huge blocks which are obtained by the art of extraction so greatly improved today. This depends substantially either on the nature itself of the tool which cannot exceed a certain limit of its peripheral cutting speed without being subjected to serious damage, or, on the mechanical links between the components forming the aforementioned bearing structures. In fact, current types of structure would be subjected to very dangerous resilient vibrations and oscillations which would not ensure the execution of perfect cutting work and would thus participate in kinematic instability of the said working member.

A further disadvantage met with in machines fitted with trucks in known use with a fixed table, is due to the feature that the conduct of the work only permits execution of the slabbing operation along vertical planes which are all parallel with one another so that when it is necessary to execute on the block a subsequent cutting operation for example, on planes at right angles to those of the preceding operation, it is necessary to remove from the platform of the truck, then to replace, all the slabs obtained in the course of the first cutting operation, by rotating them generally through an angle of 90°.

According to the present invention a mechanical saw for cutting blocks of marble is characterized by the fact that the pillars of the spans supporting the cutting tool or tools are formed by a fixed structure and by a vertically displaceable structure, the said fixed structure being formed by base blocks disposed laterally relatively to the direction of displacement of the blocks to be sawed, on which base blocks there are superimposed longitudinal beams, called level compensations, which, in turn, are rigidly connected to stands provided with projections in the form of sleeves adapted to receive and retain components, preferably cylindrical, constituting guides for the vertical sliding of the vertically displaceable structures of the pillers.

A bench for use in conjunction with the above mechanical saw comprises the support of a platform bearing the block to be cut, which can thus be subjected to angular displacements relatively to the chassis of the truck.

With this arrangement, using only one truck, slabs may be obtained having a rectangular or square shape, strips and the like. Furthermore, in accordance with the basic concept of the present invention, it is proposed to construct block-carrying benches in the form of a truck in which the suspension chassis of the truck is connected to a block-carrying platform. This platform is made rotatable relatively to the structure of the chassis so that a suspension support is interposed between the two platforms. Consequently, after the first cutting operation of the block is effected in the normal manner in planes parallel to the direction of displacement of the truck, the block-carrying platform can be turned through a certain angle, for example, 90° so that all the previously obtained slabs are presented in a position in which they are disposed in planes normal to the direction of displacement of the carriage. Then further slabs are cut, these cuts being thus effected in planes which are all normal to the planes of the preceding cuts. The slabs obtained in this manner are of a length equal to the depth of the block, a thickness defined by the first series of cuts and a width defined by the second series of cuts.

The invention will now be described further, by way of example, with reference to the accompanying drawings, in which:

FIGURE 1 is a plan view of a machine constructed in accordance with the invention;

FIGURE 2 is an elevation view of the machine when the bearing structure is lowered;

FIGURE 3 is an elevational view of the machine when the displaceable bearing structure is in its position of maximum height;

FIGURE 4 is a cross section corresponding to FIGURE 2;

FIGURE 6 is an elevation side view of a type of truck constructed in accordance with the invention and provided with an orientable platform;

FIGURE 7 is a plan view of FIGURE 6;

FIGURE 8 is a cross section taken on the line x—x of FIGURE 7; and

FIGURES 9 and 10 are details in cross section of the supporting devices of the orientable platform on the frame of the truck.

Figure 5:
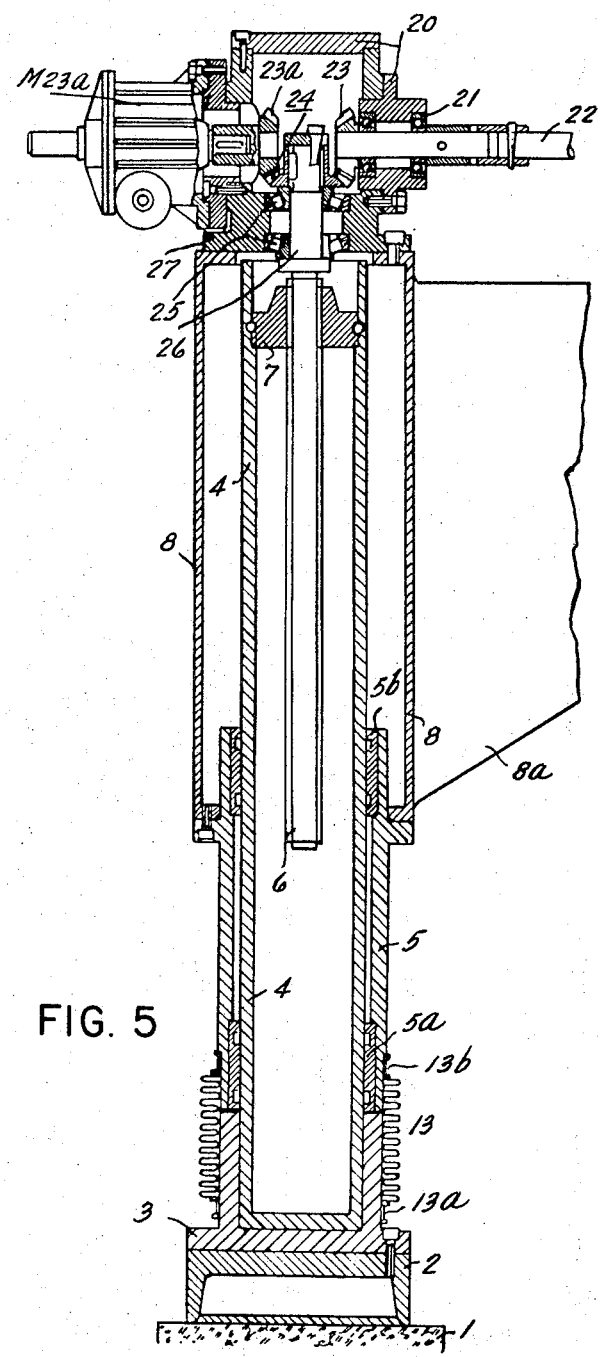
FIGURE 5 is a vertical section through one of the pillars of the bearing structure.

With reference to FIGURES 1 to 5, the bearing structure of the machine (see particularly FIG. 5) is formed, in its fixed lower part, by a stand of strong construction formed by two beams 2 fixed along corresponding base blocks 1. The latter are generally constructed of reinforced concrete and are in turn rigidly connected to the ground. Bases 3, preferably in the form of a sleeve with a circular base, are fixed to the upper terminals of the two side beams 2. Each of these bases 3 serves for the mounting and rigid securing of a cylindrical core 4, generally hollow, which acts as a guide member for the vertical displacement of one of the two hollow counter-cylinders 5. Counter-cylinders 5 are provided with a large sleeve 8 which is part, together with screw 6 and cross beams 8a, of the mobile construction or structure constituting a gantry 6, 8, 8a etc. in the form of a gantry comprising the cross beams 8a.

The link, for longitudinal stiffening between the two gantries is ensured by the side beams 8b (see FIG. 1).

The two hollow tubular members 5 of each gantry have projections for fittings 5a, 5b disposed at their terminals and tightly mounted on the cylinder 4.

The beams 8a form the support of a bridge on which is fixed a working tool 10 together with its driving, transmission and control members, such that a beam 9, bridged between the beams 8a can accomplish vertical displacements to bring the cutting tool 10 to the desired working position. With the arrangement according to the invention, this is obtained by simultaneous rotation of four screws 6 each disposed within one of the guiding cylinders 4.

The upper end of each tubular component 8 of the gantries is provided with a fixed plate 27 which is fitted with a roller bearing 25 which over-hangs the upper end of the screw 6. Fixed to the plate 27 is also a casing 20 which serves to connect and support the members transmitting movement to the screw 6. This transmission is formed by the pair of bevel gears 23, 24 the gear 24 being fixed to the end 26 of the screw 6 and the gear 23 being supported by a ball race 21 which, in turn, is mounted in the casing 20. The gear 23 is keyed on the driving shaft 22 of the transmission kinematically connected to similar devices.

The beams 8a constitute, the supports of the bridge 9 carrying the working tool 10 with the casing 20 in which are contained a motor and the corresponding transmission. The kinematic link between the four cylindrical uprights of the fixed construction and the cylinder 5 for displacement relative to the gantries of the mobile construction, is illustrated in cross section in FIG. 5. As already stated, the hollow guiding cylinder 4 constitutes the essential connection between the fixed pillar and the displaceable pillar and is kept in its upper position by the reaction of a nut 7 with which the said cylinder is provided.

The said cylinder 4 is provided in its upper region with a projection, preferably circular, on which there is mounted the nut 7. This is provided with a tapping receiving the threaded stem of the screw 6. The lower end of screw 6 is free whilst its upper end 26 as already stated, is connected to the transmission members 25, 24, 23, 22.

Along the outer surface of each of the cylinders 4 there is displaced the cylindrical tubular member 5, so that, when it is necessary to effect a raising or lowering operation, it is only necessary to move the corresponding motor M23a so that the operated gear 23a drives the transmission members 24, 23, 22 and the upper end 26 of the screw 6.

This screw turning in the nut 7, reacts so that it rises or falls relatively to the fixed position of the nut and turns the connecting shafts 22 thus obtaining simultaneous displacement of all the cylindrical components 5 relative to their respective cylinder 4, as well as a vertical displacement of the entire mobile bearing structure and, consequently, of the tool 10.

FIG. 5 also illustrates a protective sheath 13 between the members constituting the fixed pillar and the members constituting the displaceable pillar.

This sheath 13, preferably of resilient material, encloses the sliding connecting device between the aforementioned members thus making it always possible, despite the surrounding conditions created by the sawing operation effected by the machine, to achieve a high degree of efficiency of the inner surfaces along which the calibrated fittings 5a, 5b of the tubular element 5 slide.

The lower end 13a of the cylindrical sheath 13 is rigidly connected to the outside of the base of sleeve 3, whilst its upper end 13b is rigidly connected to the lower end of the tubular element 5 of the displaceable pillar.

It should be observed that, according to suitable known arrangements, the empty space existing between the fixed cylinder 4 and the displaceable tubular member 5 may constitute a lubricating chamber to facilitate the sliding of fittings 5a, 5b. In fact, the upward and downward displacements of the mobile structure may be freely accomplished, whilst the outer surface of the supporting cylinder and, in particular, the sliding zone on this surface of the sleeve, remain completely protected from dust and atomized water during the course of the work. As fas as the improvement made to the truck transporting the block is concerned, the truck is designed and constructed so as to render possible transverse subdivisions of the block so as to reduce it, for example, into strips or a slab, without having to subject it to a new operation on different other machines.

The aforementioned truck is formed substantially of a connecting platform 31, serving as a connecting structure for the supports 33 of the axles 34 provided with wheels 35 which, as will be seen hereinafter, are shaped in a special manner, and with a platform 32, connected by means of suspension members in the form of a bushing (socket) so that it can be made adjustable relatively to the connecting platform.

FIGS. 6 and 9 show by way of example an embodiment of the means interposed between the connecting platform 31 and the platform 32. These means, which in substance constitute a bushing or socket-like support coupled to a support having a circular perpihery, are shown in FIGS. 7 and 8 in the manner in which they are constructed. They comprise a pivot 51 fixed to the platform 32 in such a manner that on its vertical axis y—y are located the centers of both platforms, 31 and 32. The pivot 51 is free to rotate about the flange 41 which serves as a projection and consequently is rigidly connected to the platform 31.

Centrally placed on the said axis y—y and formed of sections 43 constituting an open casing, there is a circular guide rigidly connected to the connecting platform 31. Ball bearings 101 can roll in this guide and section irons 52, 53 rest on and against these ball bearings 101 forming an upper circular guide rigidly connected to the lower surface of the platform 32. FIGS. 8 and 9 show this construction, whilst FIG. 10 shows a variation similar to the preceding. The arrangement may obviously be realized also by using a bushing interposed as a crane, or the equivalent.

In general, the aforementioned unit, is substantially very similar to a large ball bearing, the platform 32 being superimposed on the platform 31. Thrust bearings 45, provided on the components forming part of the structure of the connecting platform 31, may be made to correspond with perforations 55 located in a circle on the components forming part of the working platform 32. This enables the upper platform 32 to be locked in any predetermined working position when it has been turned, for example, by an operation carried out with the lever 102, through a certain number of degrees relatively to the lower connecting platform 31. It is always possible, after a first series of cuts of the block has been made and by maintaining the truck 31 in the same position on the guide bearings, to turn the platform 32 and the block already cut, through a certain number of degrees relatively to the connecting platform 31 and then to lock it by means of a rod 63. It is thus possible to subject the block to a second series of cuts which are contained in planes parallel to each other and having, relatively to the planes of the first cut, a predetermined incline, without having to remove from the truck the material resulting from the first cut.

In order to make the truck stable relatively to the sawing machine so that the cut derived from the various sawing operations, correspond to the requirements of a constant slab thickness and uniformity of surface, the truck is provided with wheels which simultaneously present a rolling shape constituted by a first portion (a–b) adapted to the section of the rails 56 which is of the known Decauville type, or equivalent, and a second portion (B–C–D–E) adapted to the wedge-shaped portion of the prismatic precision guides 57 or the like for the carriages of machine tools.

I claim:

1. In a mechanical stone-cutting apparatus, which comprises a lower fixed structure, an upper vertically movable structure slidable on said lower fixed structure, a horizontally movable tool supporting gantry mounted on said movable structure for the horizontal displacement of the cutting tool, and a stone-carrying, uniplanarly rotatable, rail-supported carriage positioned underneath said cutting tool, the improvement comprising a hollow, sleeve-like and cylindrical uppermost portion of said fixed structure, said portion containing guiding elements for the vertical movements of said movable structure, said guiding elements consisting of an inwardly facing circular projection fixed on the upper inner surface of the sleeve-like cylindrical portion, a tubular threaded nut mounted on said projection, and a rod-like screw threaded in said nut and axially concentric with the longitudinal axis of the sleeve-like cylindrical portion and kinematically connected with outer power transmission means located on said gantry.

2. In the mechanical stone cutting apparatus of claim 1, the improvement consisting in peripheral dual configurations of the wheels of said carriage, the first of which is substantially L-shaped and is adapted for rails of the Decauville type, or equivalent, and the second of which, positioned on the outside of the first, is substantially V-shaped and is adapted for rails of the prismatic type.

References Cited

UNITED STATES PATENTS

| | | | |
|---|---|---|---|
| 1,741,321 | 12/1929 | Legge | 125—13 |
| 2,506,076 | 9/1954 | Garrison | 125—14 |

FOREIGN PATENTS

| | | |
|---|---|---|
| 1,089,054 | 9/1954 | France. |
| 1,319,139 | 1/1963 | France. |
| 7,105 | 4/1891 | Great Britain. |
| 366,770 | 1/1939 | Italy. |

HAROLD D. WHITEHEAD, *Primary Examiner.*